(12) United States Patent
Rodman

(10) Patent No.: US 11,033,008 B2
(45) Date of Patent: Jun. 15, 2021

(54) VIVARIUM SYSTEMS

(71) Applicant: William L Rodman, Bellevue, WA (US)

(72) Inventor: William L Rodman, Bellevue, WA (US)

( * ) Notice: Subject to any disclaimer, the term of this patent is extended or adjusted under 35 U.S.C. 154(b) by 623 days.

(21) Appl. No.: 15/996,989

(22) Filed: Jun. 4, 2018

(65) Prior Publication Data
US 2018/0343838 A1    Dec. 6, 2018

Related U.S. Application Data

(60) Provisional application No. 62/603,525, filed on Jun. 5, 2017.

(51) Int. Cl.
| | |
|---|---|
| *A01K 1/03* | (2006.01) |
| *A01K 63/00* | (2017.01) |
| *A01K 63/04* | (2006.01) |
| *A01K 63/06* | (2006.01) |

(52) U.S. Cl.
CPC .......... *A01K 63/006* (2013.01); *A01K 63/003* (2013.01); *A01K 63/04* (2013.01); *A01K 63/065* (2013.01)

(58) Field of Classification Search
CPC .... A01K 63/04; A01K 63/065; A01K 63/003; A01K 1/03; A01K 1/031; A01K 63/00; A01K 63/006; A01K 63/042; A01K 63/06; A01G 7/045
USPC ....... 119/246, 452, 201, 266, 453, 473, 482, 119/501; 47/69
See application file for complete search history.

(56) References Cited

U.S. PATENT DOCUMENTS

| | | | | |
|---|---|---|---|---|
| 4,117,805 A | * | 10/1978 | Ward | A01K 63/003 119/246 |
| 5,135,400 A | * | 8/1992 | Ramey | A01K 63/003 119/246 |
| 5,183,004 A | * | 2/1993 | Trent | A01K 63/003 119/246 |
| 5,315,965 A | * | 5/1994 | Davis | A01K 63/003 119/201 |
| 5,713,304 A | * | 2/1998 | de Vosjoli | A01K 63/003 119/266 |
| 7,481,183 B2 | * | 1/2009 | Van Heygen | A01K 63/003 119/246 |
| 9,363,978 B2 | * | 6/2016 | Mihlbauer | A01K 1/03 |
| 9,992,980 B2 | * | 6/2018 | Tominaga | A01K 1/03 |
| 2003/0150394 A1 | * | 8/2003 | Wolfe | A01K 63/003 119/246 |

(Continued)

*Primary Examiner* — Yvonne R Abbott-Lewis
(74) *Attorney, Agent, or Firm* — Williams Kastner & Gibbs PLLC; Mark Lawrence Lorbiecki

(57) ABSTRACT

An enclosure capable of supporting one or more phyla of living plants and organisms includes various panels that form the enclosure along with at one front door panel movable to provide access to the interior of the enclosure. A water inlet port is arranged in the top assembly. A drainage system is located on the bottom of the enclosure includes a sloped drainage panel, a sump, and a drain tube. The enclosure further includes an air circulation and ventilation system having the upper vent screen and a lower vent screen separable by a circulation distance that generates a chimney effect within the enclosure. The enclosure may also include a microfauna trough on top of the drainage panel.

17 Claims, 9 Drawing Sheets

(56) References Cited

U.S. PATENT DOCUMENTS

2015/0250134 A1* 9/2015 Hicks .................... A01K 63/06
119/246

* cited by examiner

VIVARIUM SYSTEMS

PRIORITY CLAIM

This application claims priority from U.S. Provisional Patent Application No. 62/603,525 filed on Jun. 5, 2017 and the subject matter of which is incorporated herein by reference in its entirety.

FIELD OF THE INVENTION

The present invention generally relates to vivariums, vivarium systems having a drainage system, an air circulation system, or both, and methods for making same.

BACKGROUND

About 1842, Dr. Nathanial Bagshaw Ward published his discovery and method of using sealed protective containers to protect tropical plants during their importation and transport to Europe. His approach unleashed a revolution in the mobility of commercially important plants. FIG. 1 shows an example of a "Wardian case" 1 developed after Dr. Ward's publication. The Wardian case 1 includes a frame that holds a glazing material in place to maintain humidity and allow for the penetration of sunlight. As time passed, horticulturists advanced the Wardian case 1 to accommodate for variations in lighting, humidity, temperature, and circulation. With the growing popularity of indoor gardening, the terrarium was born. A vivarium is generally a specialized type of terrarium for the storage and safe keeping of small animals, insects, amphibians, snakes, or other reptiles.

U.S. Pat. No. 5,000,118 to Merritt describes a large scale, walk-in display where plants, animals, and aquatic features all exist within the same enclosure, and are arranged so as to create an optically pleasing experience. U.S. Pat. No. 5,363,801 to Watters describes a basic enclosure system for raising animals and plants. Watters describes a glass enclosure with a locking mechanism for securing the top, as well as randomly-placed, rudimentary ventilation system having circular vents that aid in creating air currents to prevent waste gases from accumulating at the bottom of the enclosure. U.S. Pat. No. 6,651,586 to Horth describes a molded structure that provides the ability to create both water and land features. Lastly, U.S. Pat. No. 7,934,471 to Ford describes an alternative construction technique to Horth's structure wherein an aquatic area is constructed of sealed members. Ford's invention, like Watters, Merritt, and Horth, does not provide information on how the features of the enclosure interacts to sustain the living organisms inside.

BRIEF SUMMARY OF THE INVENTION

One embodiment of the present invention is generally directed toward an enclosure capable of supporting one or more phyla of living plants and organisms. The enclosure includes a floor panel, side wall panels fixed to the floor, a back wall panel fixed to the side wall panels and the floor panel, and a top assembly that further includes a top forward panel, a top rear panel, and an upper vent screen coupled to the top forward and top rear panels. The top forward panel is fixed to the side wall panels, and the top rear panel is fixed to the side wall panels and the back wall panel. The enclosure further includes at least one front door panel movable to provide access to the interior of the enclosure, a water inlet port arranged in the top assembly, and a drainage system located near a bottom section of the enclosure. The drainage system includes a drainage panel fixed to the side wall panels and located above the floor panel to provide a dead air gap between the drainage panel and the floor panel. The drainage panel has a slope defined by an upper end of the drainage panel and a lower end of the drainage panel. And, the drainage system includes a sump located adjacent to the lower end of the drainage panel. The enclosure further includes a drain tube extending from the sump to a location outside of the enclosure. And the enclosure further includes an air circulation and ventilation system having the upper vent screen and a lower vent screen. The air circulation and ventilation system includes the upper vent screen and a lower vent screen. The upper vent screen and the lower vent screen are separable by a circulation distance defined by a vertical distance between the upper and lower vent screens. The lower vent screen is located below the at least one front door panel. The circulation distance generates a chimney effect that continually moves air throughout the enclosure.

Another embodiment of the present invention is directed toward an enclosure capable of supporting one or more phyla of living plants and organisms. The enclosure includes a floor panel, side wall panels fixed to the floor, a back wall panel fixed to the side wall panels and the floor panel, and a top assembly that further includes a top forward panel, a top rear panel, and an upper vent screen coupled to the top forward and top rear panels. The top forward panel is fixed to the side wall panels, and the top rear panel is fixed to the side wall panels and the back wall panel. The enclosure further includes at least one front door panel movable to provide access to the interior of the enclosure, a water inlet port arranged in the top forward panel, and a drainage system located near a bottom section of the enclosure. The drainage system includes a drainage panel fixed to the side wall panels and located above the floor panel to provide a dead air gap between the drainage panel and the floor panel. The drainage panel has a downward slope in a back-to-front direction relative to the enclosure. The drainage system includes a sump located between a rear end of the drainage panel and the back wall panel. And, the enclosure further includes a drain tube extending from the sump to a location outside of the enclosure.

Another embodiment of the present invention is directed toward an enclosure capable of supporting one or more phyla of living plants and organisms. The enclosure includes a floor panel, side wall panels fixed to the floor, a back wall panel fixed to the side wall panels and the floor panel, and a top assembly that further includes a top forward panel, a top rear panel, and an upper vent screen coupled to the top forward and top rear panels. The top forward panel is fixed to the side wall panels, and the top rear panel is fixed to the side wall panels and the back wall panel. The enclosure further includes at least one front door panel movable to provide access to the interior of the enclosure, a water inlet port arranged in the top assembly, and an air circulation and ventilation system. The air circulation and ventilation system includes the upper vent screen and a lower vent screen. The upper vent screen and the lower vent screen are separable by a circulation distance defined by a vertical distance between the upper and lower vent screens. The lower vent screen is located below the at least one front door panel. The circulation distance generates a chimney effect that continually moves air throughout the enclosure.

Another embodiment of the present invention is directed toward a drainage system for an enclosure. The drainage system includes a drainage panel fixed to the side wall panels and located above the floor panel to provide a dead air gap between the drainage panel and the floor panel. The drainage panel has a slope defined by an upper end of the drainage panel and a lower end of the drainage panel. The drainage system includes a sump located adjacent to the lower end of the drainage panel. A drain tube extends from the sump to a location outside of the enclosure.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION OF THE INVENTION

Figure 1:
FIG. 1 shows a prior art Wardian case.

In the following description, certain specific details are set forth in order to provide a thorough understanding of various embodiments of the invention. However, one skilled in the art will understand that the invention may be practiced without these details. In other instances, well-known structures associated with vivariums, naturalistic vivariums, terrariums, paludariums, and other enclosures capable of supporting any of or a combination of small animals, plants, reptiles, and insects, and the methods of configuring and/or operating any of the above have not necessarily been shown or described in detail to avoid unnecessarily obscuring descriptions of the embodiments of the invention. For purposes of the present description, the term vivarium is used throughout, but it is understood that the present invention is not limited to a vivarium and may apply to other enclosures capable of supporting any of or a combination of small animals, plants, reptiles, and insects.

The present invention is generally directed to a vivarium or an improved terrarium capable of supporting an enclosed ecosystem for any of or a combination of small animals, plants, reptiles, and insects. The present invention is further directed to overcoming the problems related to configuring and maintaining a vivarium so that it is capable and remains capable in supplying an internal, ambient environment suitable for sustaining a variety of self-contained, biological ecosystems.

One embodiment of the present invention includes a light weight, thermally efficient, naturalistic vivarium with effective drainage and air circulation. Typically, vivariums are stacked on top of each other in racks and the heat rising from lower vivariums may be problematic to those above. Therefore, thermal efficiency within the vivarium may be accomplished using a dead air space between a glass-canted deck and a glass bottom and with an air circulation system having vent placements that provide a chimney effect and forced air movement throughout the vivarium. The vivarium may further include the glass-canted deck configured and placed to allow for water drainage across the canted deck to a sump that includes a drain tube for overflow.

By way of example, the captive care of rainforest amphibians, such as poison dart frogs, Dendrobatidae, requires carefully controlled environmental conditions. These animals thrive in moist, warm, environments symbiotically with plants, such as Bromeliads, and micro fauna such as isopods (Pill Bugs) and collembola (Spring Tails), as well as feeder insects, such as Fruit Files (*Drosophila*). This collection of animals, plants, and insects, are typically kept in a glass enclosure called a naturalistic vivarium (hereinafter vivarium). In addition to synthesizing a naturalistic environment, these enclosures should be able to perform a variety of functions to be effective. The organic contents within a vivarium are typically misted a few times per day using manual or computer-controlled equipment. Preferably, the organic contents are kept in a narrow temperature range and exposed to artificial sunlight for recommended periods.

Vivariums are typically constructed of glass, or combinations of glass, wood, fiberglass, and a sealer, adhesive, or both, such as, but not limited to, a silicone sealer that also functions as an adhesive for glass. Once the vivarium reaches a certain size, for example a thirty (30) gallon capacity or greater, they can be too heavy to lift by one person. Consequently, glass breakage may happen when large vivariums are transported. According to an embodiment of the present invention, it may be advantageous to incorporate lightweight materials, such as foam, plastic-cored sandwich panels, and other lightweight materials during the assembly of the vivarium.

Figure 2:
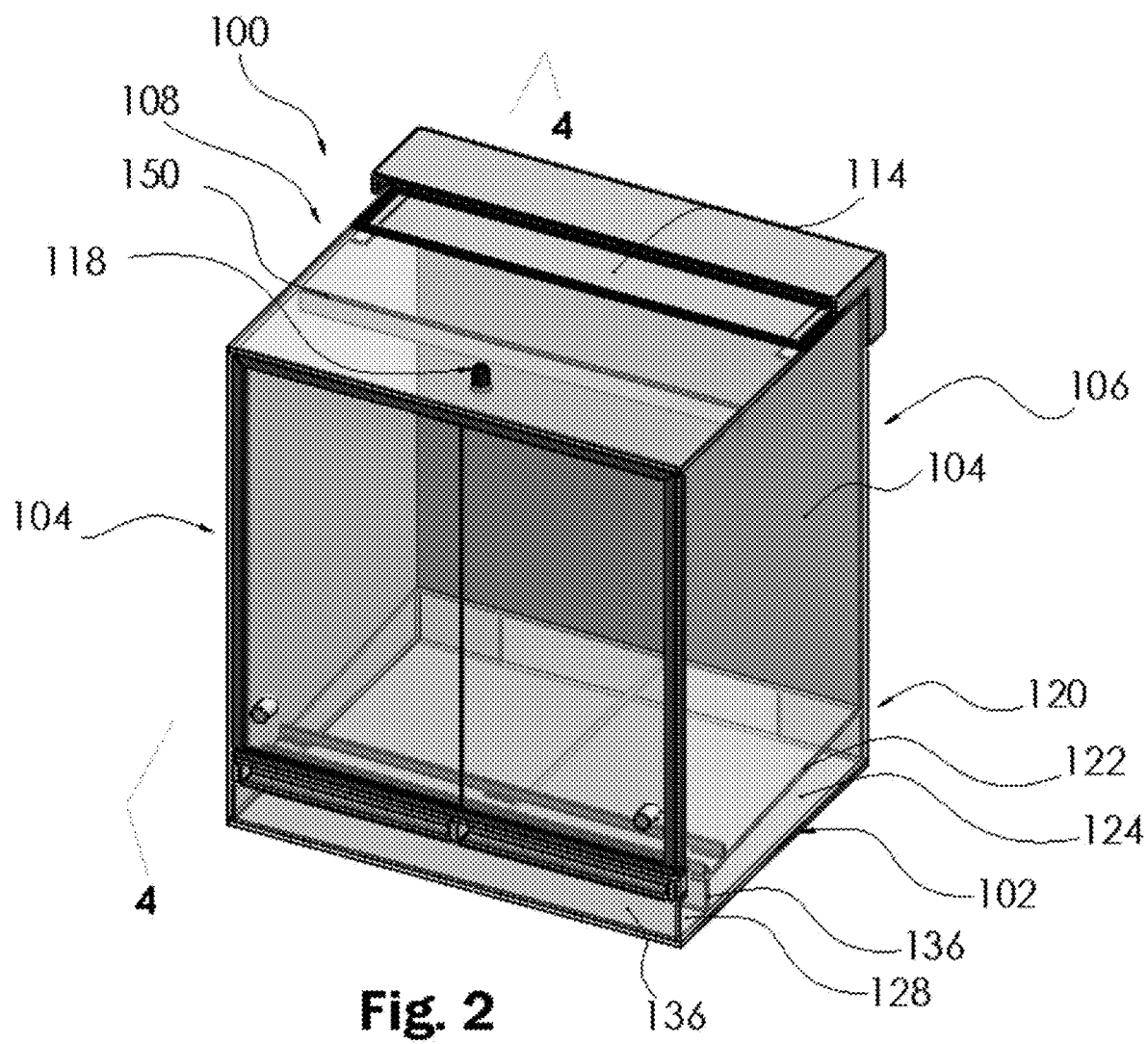
FIG. 2 is a front, perspective view of a vivarium with a drainage system and an air circulation and ventilation system according to an embodiment of the invention.

FIG. 2 shows a front, perspective view of a vivarium 100 having a floor panel 102, side wall panels 104, a back wall panel 106, and a top assembly 108 according to an embodiment of the present invention. The top assembly 108 includes a forward top panel 110, a rear top panel 112 (FIG. 5), and an upper vent screen 114. A water inlet port 118 may be coupled to the forward top panel 110. The water inlet port 118 may be configured with a nozzle capable of delivering water to the contents within the vivarium 100. By way of example, the water inlet port 118 may be programmed or configured to deliver water by spraying, dripping, or misting water onto the contents within the vivarium 100. In one embodiment, the water inlet port 118 may be moveable to direct the delivery-direction of the water.

The vivarium 100 further includes one or more front door panels 116 to permit access to an interior space of the vivarium 100. The front door panel(s) 116 may be either rotatable or slideable relative to the vivarium 100. One or all of the panels 102, 104, 106, 110, 112, and 116 may be made out of glass, a clear plastic, a composite material, or some other biologically safe material. The composite material and some particular issues with larger vivariums will be discussed in more detail with reference to FIG. 7. The glass or clear plastic panels are preferably used to allow one to view the enclosure of the vivarium 100; whereas any non-transparent materials may be used for non-viewing portions of the vivarium 100.

The vivarium 100 may further include a drainage system 120 comprising a drainage panel 122, a dead air gap 124 located between the drainage panel 122 and the floor panel 102, and a sump 128. The drainage panel 122 is installed with a downward slope 126 (FIG. 5A) with the slope having a high end where it coupled to the back wall panel 104 and a low end where it couples to the sump 128 (e.g., the downward slope 126 has a back-to-front direction relative to the vivarium 100).

Figure 3:
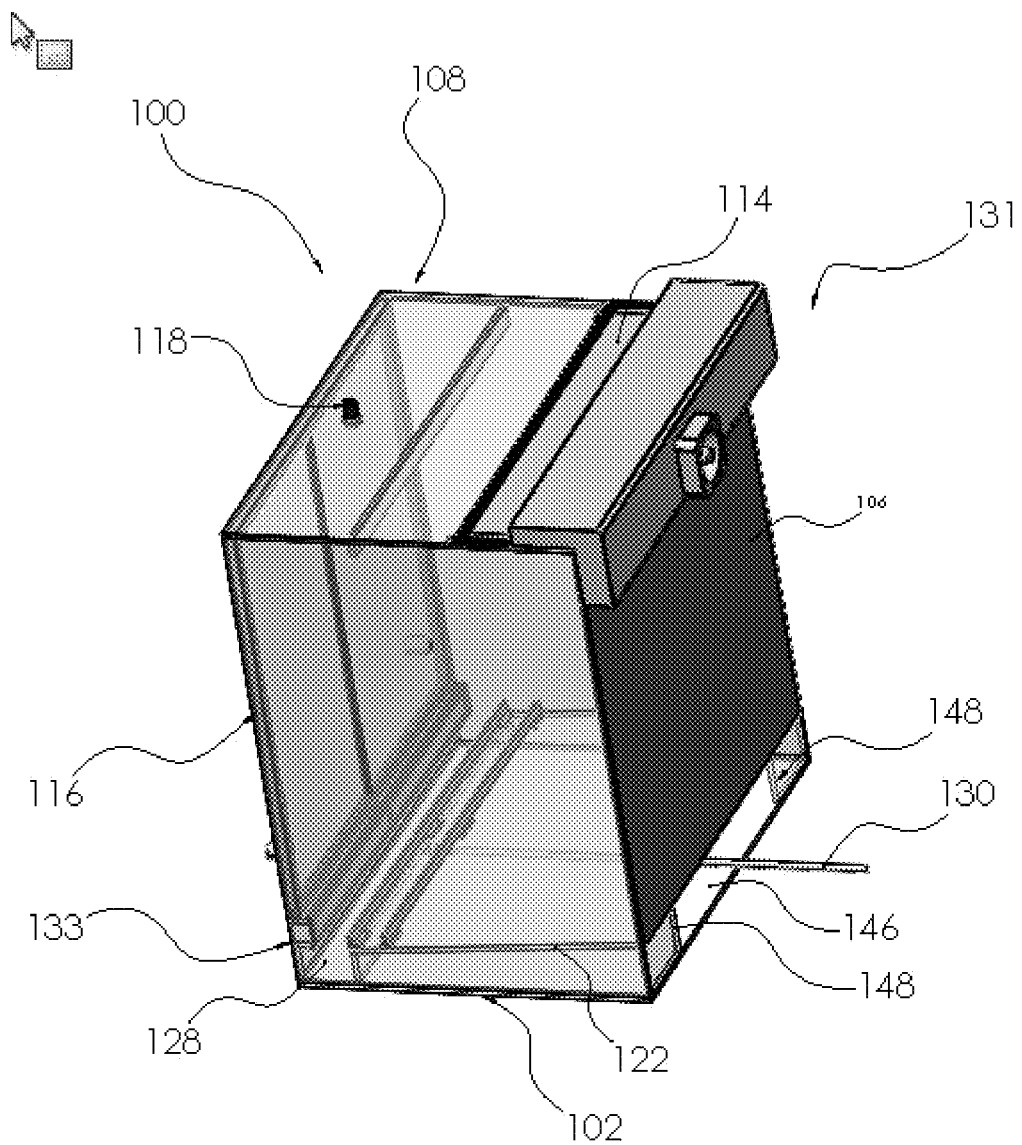
FIG. 3 is a right-side, perspective view of the vivarium of FIG. 1 according to an embodiment of the invention.

FIG. 3 shows a right-side, perspective view of the vivarium 100. In the illustrated embodiment, the back panel 102 is made from a non-transparent material. The drainage system 120 includes a drain tube 130 extending from the sump 128 to a location outside of the vivarium 100. In one embodiment of the present invention, the drain tube may be gravity induced or it may be in fluid communication with a suction device (not shown) to pull or otherwise extract water from the sump 128.

Figure 4:
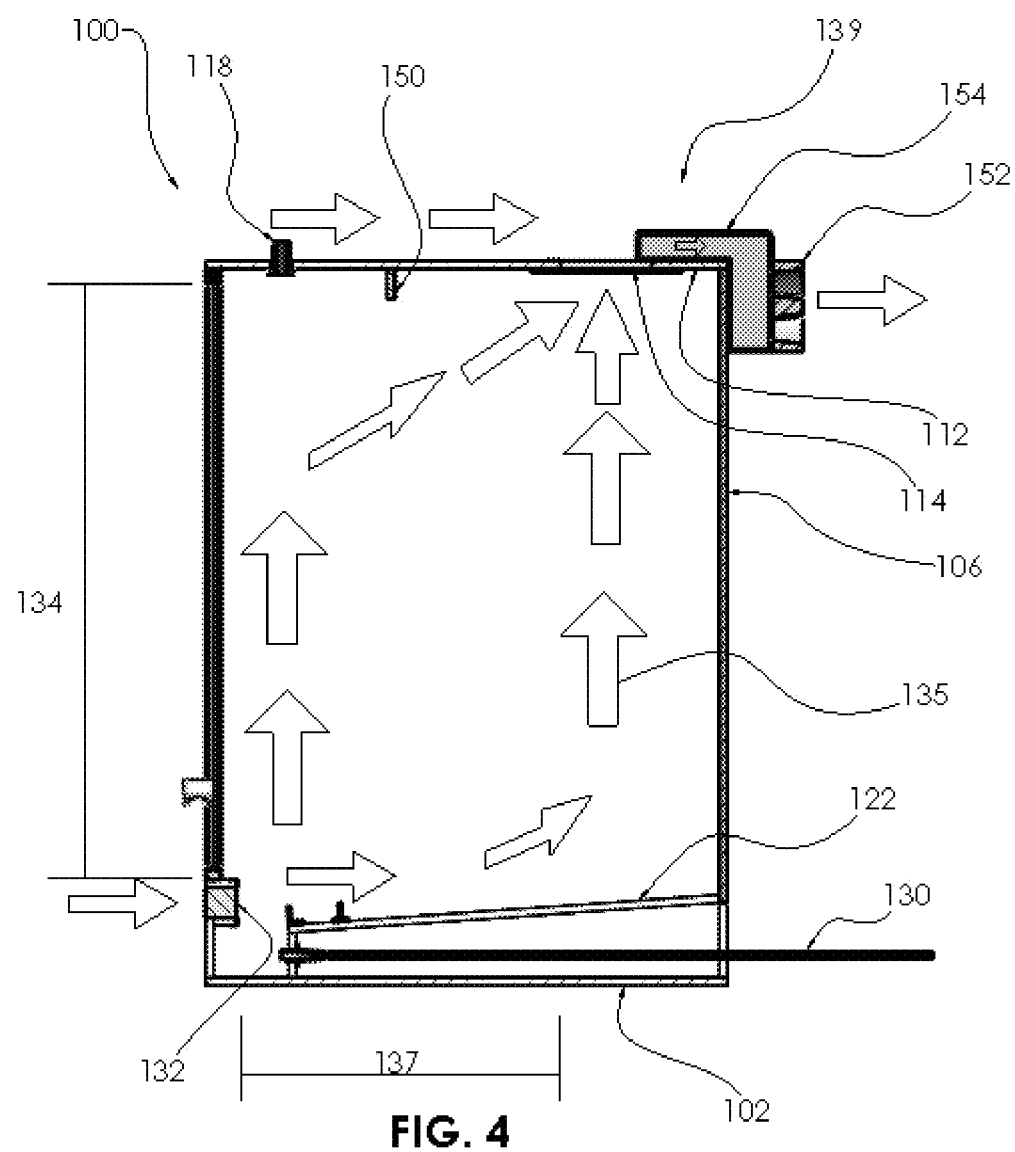
FIG. 4 is a side view of a cross-section of the vivarium of FIG. 1 taken along line 4-4 of FIG. 1 according to an embodiment of the invention.

The vivarium 100 may further include an air circulation and ventilation system 131 that preferably comprises the upper vent screen 114 and a lower vent screen 132 (FIG. 4). The lower vent screen 132 is coupled to a pair of lower vent screen spacers 133. The size of the lower vent screen spacers 133 determines a vertical height of the lower vent screen 132. In one embodiment of the present invention, the vent screens 114, 132 are made from a mesh material, and may be made from a metallic mesh material.

FIG. 4 shows a cross-sectional view of the vivarium 100 for at least the purpose of discussing the air circulation and ventilation system 131. In one embodiment of the present invention, the air circulation and ventilation system 131 may be configured to be a natural convective system with an amount of air flow 135 and a corresponding ventilation efficiency determined, at least in part, by a distance 134 defined by a height between the upper vent screen 114 and the lower vent screen 132. A lack of proper ventilation may result in a toxic accumulation of anaerobic bacteria that may reside on the surfaces of plants and other interior surfaces, which in turn may result in a noxious environment within the vivarium 100.

In the illustrated embodiment, the lower vent screen 132 is recessed rearward with respect to the front door panel(s) 116 and just slightly above the drain tube 130. The distance 134 between the upper vent screen 114 and the lower vent screen 132 may generate a convective chimney effect to naturally move the air flow 135 through the vivarium 100. In one embodiment, the chimney effect may be created when there are thermal gradients within the vivarium 100. Because most vivariums include lights (not shown) that shine through one or more portions of the top assembly 108, the upper vent screen 114 is located near the lights and the lower vent screen 132 is located in a cooler, lower section of the vivarium 100. An upper region of the vivarium 100 should naturally be warmer because of the heat radiating from the lights. Thus, the distance 134 between the upper vent screen 114 and the lower vent screen 132 sets up the chimney effect to provide a natural convection current of the air flow 135. In addition, the upper vent screen 114 is located near an aft or rear region of the vivarium 100 while the lower vent screen 132 is located near a front region of the vivarium 100, which defines a fore-aft distance 137 between the vent screens 114, 132. This fore-aft distance 137 permits the cooler, dryer air flow to waft upwards as shown by the direction of the air flow 135, which in turn may advantageously help keep moisture from forming on any of the viewing panels. Preferably, the lower vent screen 132 is oriented vertically to minimize any moisture or water from falling outside of the vivarium 100. It is contemplated that the lower vent screen 132 may have different orientations other than vertical, but such an alternate orientation may result in moisture or water moving through the lower vent screen 132 and exiting the vivarium 100.

Referring briefly back to FIG. 3, it was noted above that the size of the lower vent screen spacers 133 determines a vertical height of the lower vent screen 132 whether employing a natural convection process, a forced air process (discussed below), or some combination of both. By way of example, the height of the lower vent screen spacers 133 may operate in regulating the amount of air that can enter the vivarium 100, and the height of the lower vent screen spacers 133 may be adjusted or configured based on the climate in which the vivarium 100 will be kept. For persons that live in humid environments, the height of the lower vent screen spacers 133 may be about 1.0 inches or more. For persons that live in low humidity environments, the height of the lower vent screen spacers 133 may be about 0.25 inches or less. Other environments may dictate that the height of the lower vent screen spacers 133 be somewhere between about 0.25 inches and 1.0 inches. Likewise, the width of the upper vent screen 114 may be adjusted to be larger or smaller according to the environment. For example, the width of the upper vent screen 114 may be about 3.0 inches or more for humid environments and about 1.0 inches or less for low humidity environments. Or, the width of the upper vent screen 114 may be between about 1.0 inches and about 3.0 inches. Preferably, the opening adjacent to the upper vent screen 114 should be larger than the opening defined by the lower vent screen spacers 133 to more adequately generate the chimney effect within the vivarium 100.

Referring briefly back to FIG. 4 and in another embodiment of the present invention, the air circulation and ventilation system 131 and the resulting chimney effect may be optionally augmented by a forced air circulation system 139 configured to generate a negative pressure across the upper vent screen 114 and draw air from within the vivarium 100. As such, the air circulation and ventilation system 131 may optionally include a fan 152, or other device for the forced ingress or egress of air, and a duct 154.

In the illustrated embodiment, the duct 154 is mounted to an upper rear portion of the vivarium 100 with the fan 152 coupled to the duct 154. When the fan 152 is on, the fan 152 draws air from within the vivarium 100 and may advantageously generate a venturi pressure differential between an interior and an exterior of the vivarium 100. By way of example, the fan 152 (e.g., fan speed, blade size, etc.) and the duct 154 (e.g., length, depth, etc.) may be configured to achieve the desired venturi pressure differential for a particular vivarium 100. In a preferred embodiment of the present invention, the forced air circulation system 139 does not block the natural convection process of the upper and lower vent screens, 114, 132, when the fan is switched off. The continual operation of the natural convection air flow 135 may advantageously prevent stagnant air from occupying the vivarium 100.

Figure 5A:
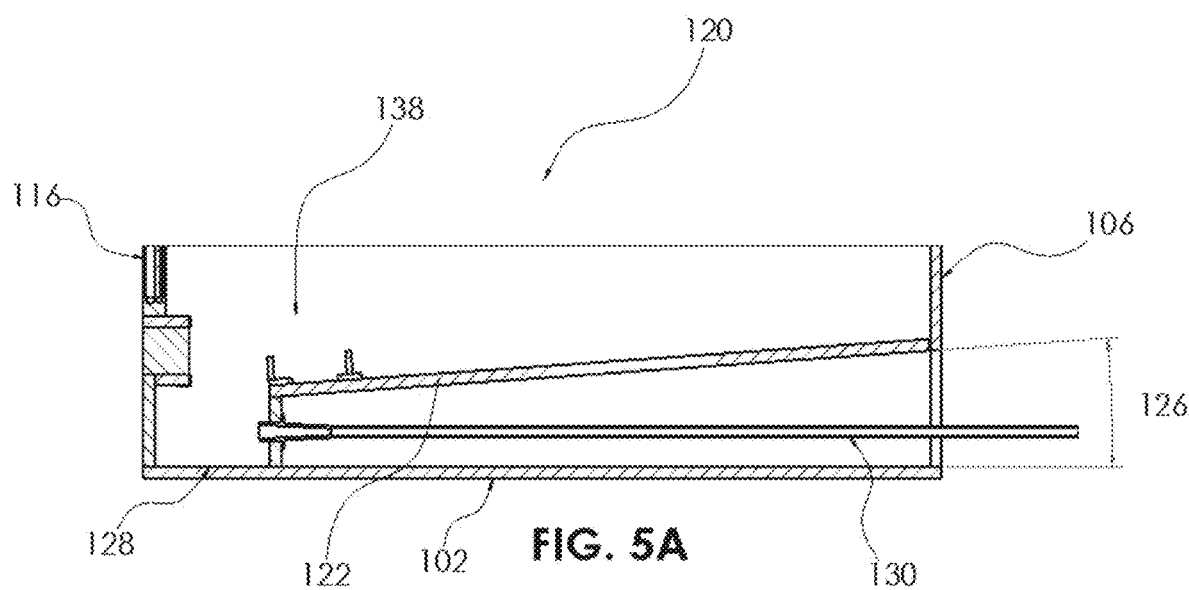
FIG. 5A is a cross-sectional view of a lower portion of FIG. 4 according to an embodiment of the invention.
Figure 5B:
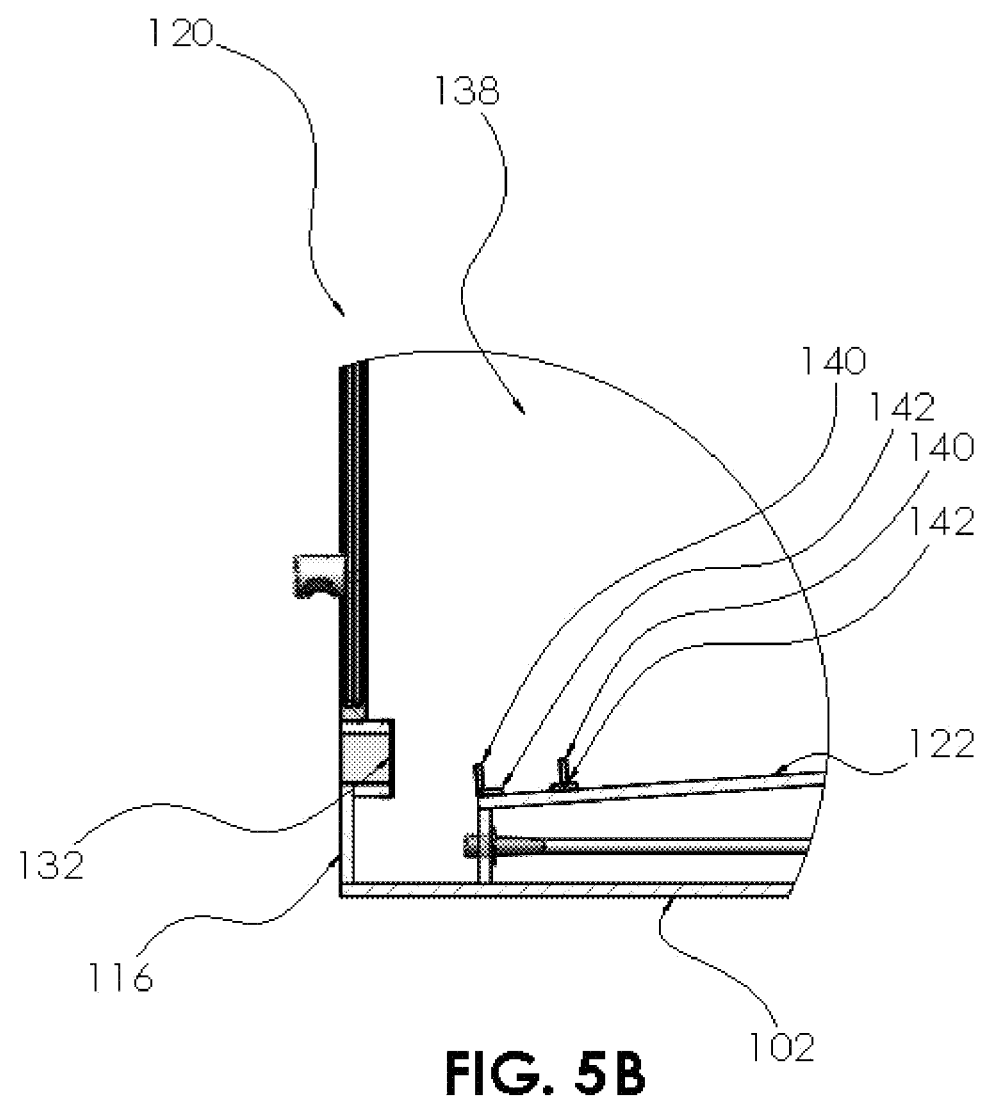
FIG. 5B is a close-up, cross-sectional view of a lower corner portion of FIG. 4 according to an embodiment of the invention.
Figure 5C:
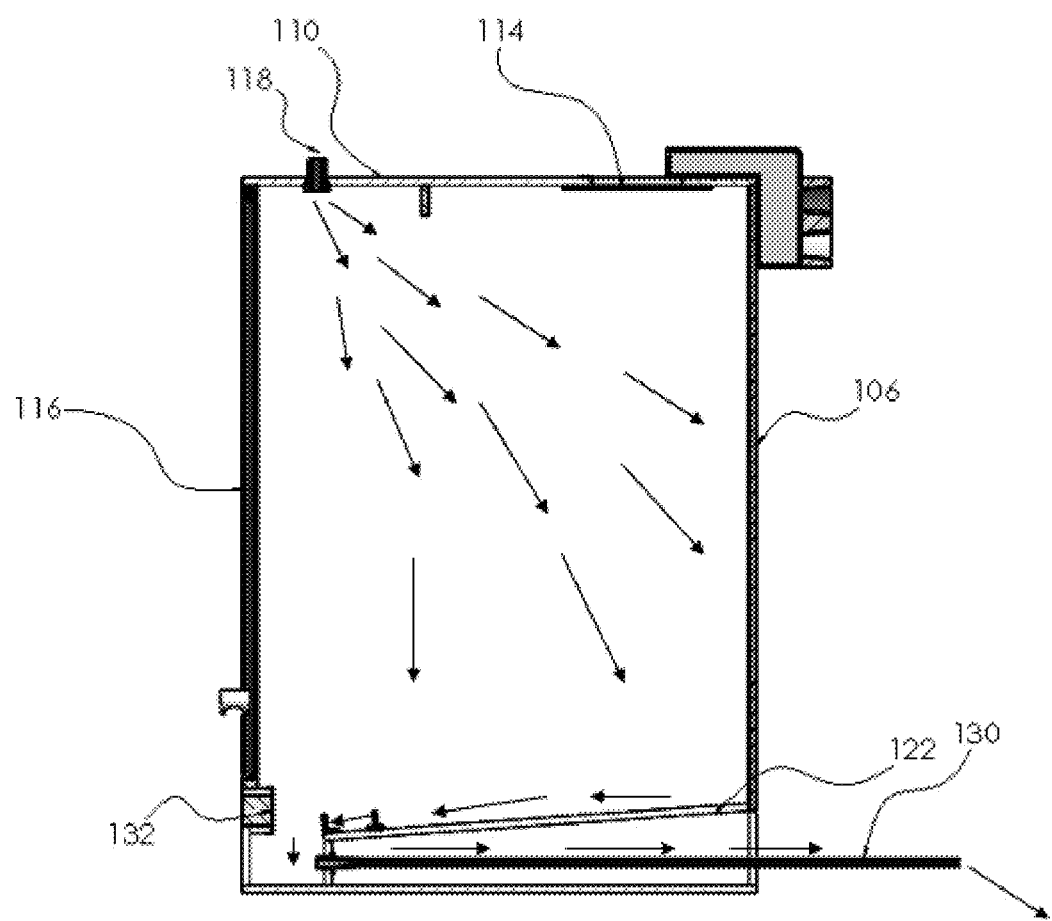
FIG. 5C is the same view as FIG. 4 showing water drainage within the enclosure according to an embodiment of the invention.

FIGS. 5A-5C show the drainage system 120 of the vivarium 100 according to an embodiment of the present invention. In operation, the drainage system 120 allows for drainage of accumulated water, typically supplied by periodic misting from the water inlet port 118 as shown in FIG. 5C, within the vivarium 100. In an operational state, the vivarium 100 may include soil (not shown) and possibly plants (not shown) that would cover at least a portion of the drainage panel 122. In one embodiment, plants may optionally be attached to an organic substrate attached to the back wall panel 106. Because it is often undesirable to have standing water in the vivarium 100, the sump 128 may be at least partially filled with a porous media such as, but not limited to, calcined clay, gravel, sand, or other types of porous media. In one aspect, the drainage system 120 operates to advantageously benefit the health and growth of plants within the vivarium 100. Without proper drainage, the plants may drown in a pool of water and eventually succumb to rot and other maladies. Also, without proper drainage, a toxic accumulation of anaerobic bacteria may linger and grow under the soil (not shown), which may result in a swampy, noxious, environment.

According to one embodiment, the water inlet port 118 periodically emits a fine spray of water such as a mist, which may accumulate within the vivarium 100 to form droplets that eventually flow down to the drainage panel 122. In a preferred embodiment, the slope 126 of the drainage panel 122 is in a range of at least two degrees and not greater than twenty-five degrees, which allows water to flow over the drainage panel 122 toward the sump 128. The slope 126 of the drainage panel 122 is preferably sloped from in a back-to-front direction, but it may be sloped in other direction such as, but not limited to, a front-to-back direction or a side-to-side direction. In other embodiments, the drainage panel may be curved or rounded to allow water to run off in one or more directions. The sump 128 may be configured to accumulate an amount of water consistent with the size of the vivarium 100, the amount of plants within the vivarium 100, and the rate of water into the vivarium 100 from the water inlet port 118, as well as other variables. Once the water in the sump 128 reaches a certain level, the water in the sump 128 exits through the drain tube 130. It is preferable to maintain at least some water in the sump 128 to help aid in humidifying the air flowing within the vivarium 100.

Figure 6:
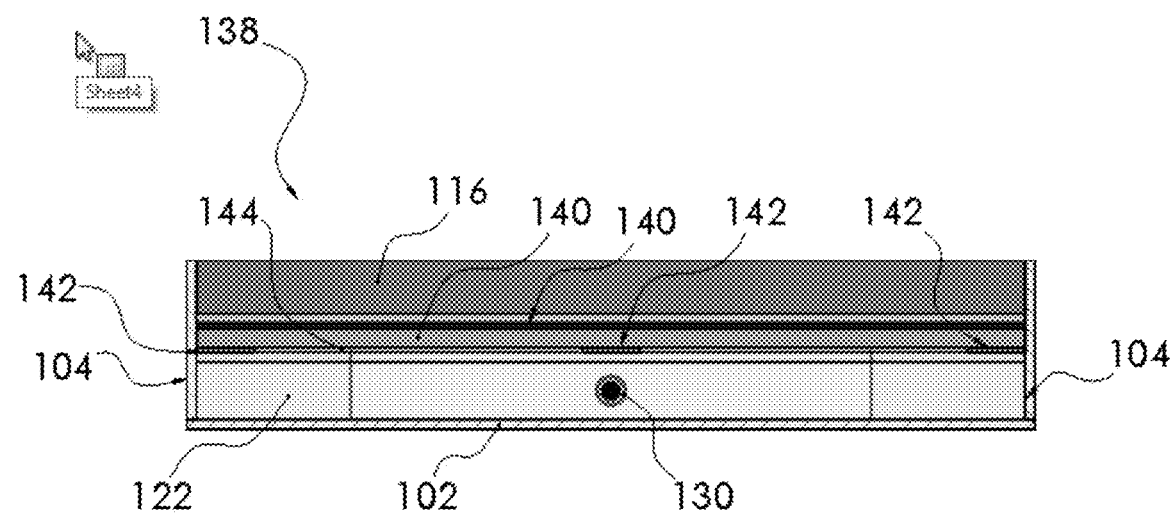
FIG. 6 is a close-up, cross-sectional, front view of a lower portion of the vivarium of FIG. 1 according to an embodiment of the invention.

Still referring to FIGS. 5A and 5B and also FIG. 6, the vivarium 100 includes a microfauna trough 138 according to another embodiment of the present invention. By way of example, microfauna may be cultured on various media and that cultured media may be placed into the microfauna trough 138.

The microfauna trough 138 may be located on top of and near a forward portion of the drainage panel 122, but may be located on other locations relative to the drainage panel 122. In the illustrated embodiment, the micro fauna trough 138 includes two spaced apart stiffeners 140 with each stiffener set on a pair of spacers 142 that define an air gap 144 between the stiffeners 140 and the drainage panel 122. As best shown in FIG. 6, the air gap 144 allows water to flow under the stiffeners 140 and fall into the sump 128.

Referring briefly back to FIG. 3, the vivarium 100 may further include an access opening 146, which allows access to at least some, if not all, portions of the drainage system 120. In the illustrated embodiment, the access opening 146 is located between a bottom edge of the back wall panel 116 and the floor panel 102. To stabilize the back wall panel 116, one or more corner supports 148 may be placed between the back wall panel 116 and the floor panel 102. The corner supports 148 along with the back wall panel 116 and the floor panel 102 defines the access opening 146.

While the structure and function of the vivarium 100 is discussed with regards to a static environment above, there are several features of the vivarium 100 incorporated to prevent it from damage or breakage during shipment or transport from one location to another. During transport, vivariums are typically packaged into crates. However, the transportation process is most likely to be the time when the vivarium 100 is vulnerable to damage or breakage.

Still referring to FIG. 3, dropping a crated vivarium imparts a shock load that is transmitted from the floor panel 102 to the top assembly 108 through the side walls 104. The shock load may cause the floor panel 102 and the top assembly 108 to act as tympanic membranes that may reverberate, chip or break. The corner supports 148 may distribute forces away from the corners of the vivarium 100. In another embodiment of the present invention, the back wall panel 116 may be extended all the way down to be in contact with the floor panel 102. In such an embodiment, an access hole (not shown) may be drilled into the back wall panel 116 to allow for passage of the drain tube 130.

In another aspect of the present invention to assist with transportation of the vivarium 100, one or more stiffeners 150 (FIG. 4) may be coupled to at least one of the panels 102, 104, 106, 110, 112, and 116 to increase a vibration resistance of said panel. In a preferred embodiment, the stiffener 150 (FIG. 4) is coupled to the forward top panel 110 (FIG. 2). One purpose of the stiffener 150 is to structurally support the forward top panel 110 if a shock load is imparted into the vivarium 100 because the forward top panel 110 is typically the most vulnerable to damage or breakage during such an event. In a preferred embodiment, the stiffener 150 extends from one side wall 104 to the other side wall 104.

Referring briefly back to FIG. 2, an advantageous aspect of the vivarium 100 may be its resistance to heat transfer from a heat source beneath the floor panel 102 of the vivarium 100. By way of example, amphibian collections are typically assembled on rack systems. For example, a typical rack system could have two or three vivariums per level, and be stacked up to three or more levels high. The lighting systems for the lower level vivariums generate heat, and heat rises. Therefore, the vivariums located above the bottom level will receive heat from the vivarium(s) beneath them. The dead air gap 124 defined by the space between the floor panel 102 and the drainage panel 122 provides an air buffer to reduce or dissipate heat transfer from a lower vivarium to an upper vivarium, which in turn may advantageously keep the upper vivarium from overheating.

Figure 7:
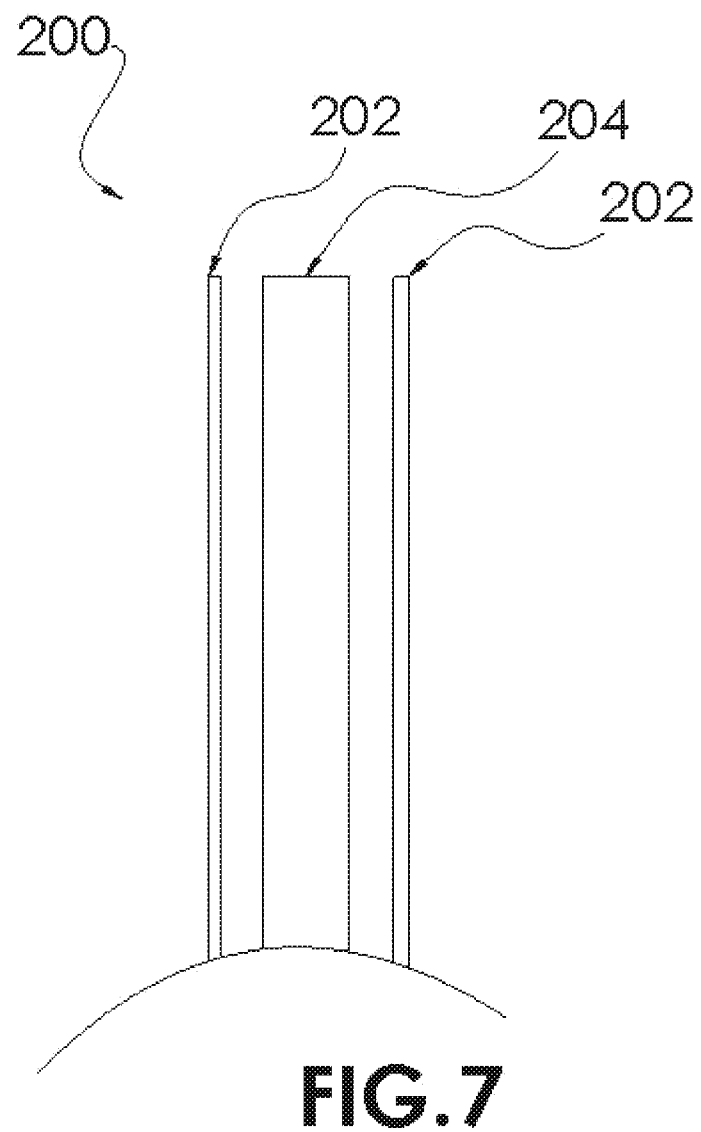
FIG. 7 is an exploded, cross-sectional view of a lightweight panel for a vivarium according to another embodiment of the invention.

FIG. 7 shows a lightweight panel 200 according to an embodiment of the present invention. The lightweight panel 200 may be used for non-viewing portions of the vivarium to reduce its overall weight. The lightweight panel 200 may include aluminum or plastic skins 202 with a thermoplastic honeycomb or foam core 204. The substitution of the lightweight panel 200, in addition to the weight reduction, may also advantageously make the vivarium easier and safer to manipulate and transport. The lightweight panel 200 may further include a surface preparation applied to the skins 202, the core 204, or both for bondability. For example, aluminum skins 202 are often phosphoric acid anodized and primed before bonding to prevent corrosion.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An enclosure capable of supporting one or more phyla of living plants and organisms, the enclosure comprising:

a floor panel;

side wall panels fixed to the floor;

a back wall panel fixed to the side wall panels and the floor panel;

a top assembly having a top forward panel, a top rear panel, and an upper vent screen coupled to the top forward and top rear panels, the top forward panel fixed to the side wall panels, and the top rear panel fixed to the side wall panels and the back wall panel;

at least one front door panel movable to provide access to the interior of the enclosure;

a water inlet port arranged in the top assembly;

a drainage system located near a bottom section of the enclosure, the drainage system having a drainage panel, the drainage panel fixed to the side wall panels and located above the floor panel to provide a dead air gap between the drainage panel and the floor panel, the drainage panel having a slope defined by an upper end of the drainage panel and a lower end of the drainage panel, and the drainage system having a sump located adjacent to the lower end of the drainage panel;

a drain tube extending from the sump to a location outside of the enclosure; and an air circulation and ventilation system comprising the upper vent screen and a lower vent screen, the upper vent screen and the lower vent screen separable by a circulation distance defined by a vertical distance between the upper and lower vent screens, wherein the lower vent screen is located below the at least one front door panel, and wherein the circulation distance generates a chimney effect that continually moves air throughout the enclosure.

2. The enclosure of claim 1, wherein at least one of the panels is made from glass or a clear plastic material.

3. The enclosure of claim 1, wherein the slope of drainage panel is in the range of at least two degrees and not greater than twenty-five degrees.

4. The enclosure of claim 1, further comprising a micro fauna trough arranged on top of and near a forward portion of the drainage panel.

5. The enclosure of claim 4, wherein the micro fauna trough comprises two spaced apart stiffeners with each stiffener set on a pair of spacers, wherein the spacers permit an air gap between the stiffeners and the drainage panel to allow water to flow under the stiffeners.

6. The enclosure of claim 1, further comprising an access opening located between a bottom edge of the back wall panel and the floor panel, wherein the access opening permits access to a region beneath the drainage panel.

7. The enclosure of claim 6, further comprising one or more corner supports located between the back wall panel and the floor panel, the corner supports along with the back wall panel and the floor panel defines the access opening.

8. The enclosure of claim 1, further comprising one or more stiffeners coupled to at least one of the panels to increase a vibration resistance of said panel.

9. An enclosure capable of supporting one or more phyla of living plants and organisms, the enclosure comprising:

a floor panel;

side wall panels fixed to the floor;

a back wall panel fixed to the side wall panels and the floor panel;

a top assembly having a top forward panel, a top rear panel, and an upper vent screen coupled to the top forward and top rear panels, the top forward panel fixed to the side wall panels, and the top rear panel fixed to the side wall panels and the back wall panel;

at least one front door panel movable to provide access to the interior of the enclosure;

a water inlet port arranged in the top assembly;

a drainage system located near a bottom section of the enclosure, the drainage system having a drainage panel, the drainage panel fixed to the side wall panels and located above the floor panel to provide a dead air gap between the drainage panel and the floor panel, the drainage panel having a slope defined by an upper end of the drainage panel and a lower end of the drainage panel, and the drainage system having a sump located adjacent to the lower end of the drainage panel; and a drain tube extending from the sump to a location outside of the enclosure.

10. The enclosure of claim 9, wherein the slope of drainage panel is in the range of at least two degrees and not greater than twenty-five degrees.

11. The enclosure of claim 9, further comprising a micro fauna trough arranged on top of and near a forward portion of the drainage panel.

12. The enclosure of claim 11, wherein the micro fauna trough comprises two spaced apart stiffeners with each stiffener set on a pair of spacers, wherein the spacers permit an air gap between the stiffeners and the drainage panel to allow water to flow under the stiffeners.

13. An enclosure capable of supporting one or more phyla of living plants and organisms, the enclosure comprising:

a floor panel;

side wall panels fixed to the floor;

a back wall panel fixed to the side wall panels and the floor panel;

a top assembly having a top forward panel, a top rear panel, and an upper vent screen coupled to the top forward and top rear panels, the top forward panel fixed to the side wall panels, and the top rear panel fixed to the side wall panels and the back wall panel;

at least one front door panel movable to provide access to the interior of the enclosure;

a water inlet port arranged in the top assembly; and an air circulation and ventilation system comprising the upper vent screen and a lower vent screen, the upper vent screen and the lower vent screen separable by a circulation distance defined by a vertical distance between the upper and lower vent screens, wherein the lower vent screen is located below the at least one front door panel, and wherein the circulation distance generates a chimney effect that continually moves air throughout the enclosure.

14. A drainage system for an enclosure capable of supporting one or more phyla of living plants and organisms, the enclosure having a top panel, side panels, a back wall panel, and a floor panel, the drainage comprising:

a water inlet port arranged in the top panel of the enclosure;

a drainage system located near a bottom section of the enclosure, the drainage system having a drainage panel, the drainage panel fixed to the side wall panels and located above the floor panel to provide a dead air gap between the drainage panel and the floor panel, the drainage panel having a slope defined by an upper end of the drainage panel and a lower end of the drainage panel, and the drainage system having a sump located adjacent to the lower end of the drainage panel; and a drain tube extending from the sump to a location outside of the enclosure.

15. The drainage system of claim 14, wherein the slope of drainage panel is in the range of at least two degrees and not greater than twenty-five degrees.

16. The drainage system of claim 14, further comprising a micro fauna trough arranged on top of and near a forward portion of the drainage panel.

17. The drainage system of claim 16, wherein the micro fauna trough comprises two spaced apart stiffeners with each stiffener set on a pair of small spacers, wherein the spacers permit an air gap between the stiffeners and the drainage panel to allow water to flow under the stiffeners.

\* \* \* \* \*